United States Patent
Gleich et al.

(10) Patent No.: US 9,957,378 B2
(45) Date of Patent: May 1, 2018

(54) METHODS AND SYSTEMS FOR MAKING REINFORCED THERMOPLASTIC COMPOSITES, AND THE PRODUCTS

(71) Applicant: JOHNS MANVILLE, Denver, CO (US)

(72) Inventors: Klaus Friedrich Gleich, Nuremberg (DE); Jawed Asrar, Englewood, CO (US); Thomas E Burghardt, Milanowek (PL); Rajappa Tadepalli, Chennai (IN)

(73) Assignee: Johns Manville, Denver, CO (US)

( * ) Notice: Subject to any disclaimer, the term of this patent is extended or adjusted under 35 U.S.C. 154(b) by 0 days. days.

(21) Appl. No.: 15/610,861

(22) Filed: Jun. 1, 2017

(65) Prior Publication Data
US 2017/0267839 A1    Sep. 21, 2017

Related U.S. Application Data

(63) Continuation of application No. 14/496,826, filed on Sep. 25, 2014, now Pat. No. 9,695,300, which is a continuation of application No. 12/476,818, filed on Jun. 2, 2009, now Pat. No. 8,883,908.

(51) Int. Cl.
| | |
|---|---|
| *C08K 7/14* | (2006.01) |
| *B29B 15/12* | (2006.01) |
| *B29C 70/32* | (2006.01) |
| *B29C 70/36* | (2006.01) |
| *B29C 70/52* | (2006.01) |
| *B29C 70/54* | (2006.01) |
| *C08K 7/28* | (2006.01) |
| *B29K 101/12* | (2006.01) |
| *B29K 105/12* | (2006.01) |
| *B29K 77/00* | (2006.01) |
| *B29K 105/00* | (2006.01) |

(52) U.S. Cl.
CPC .............. *C08K 7/14* (2013.01); *B29B 15/125* (2013.01); *B29C 70/32* (2013.01); *B29C 70/36* (2013.01); *B29C 70/521* (2013.01); *B29C 70/545* (2013.01); *C08K 7/28* (2013.01); *B29K 2077/00* (2013.01); *B29K 2101/12* (2013.01); *B29K 2105/0002* (2013.01); *B29K 2105/0014* (2013.01); *B29K 2105/12* (2013.01)

(58) Field of Classification Search
CPC ....... B29B 15/125; B29C 70/32; B29C 70/36; B29C 70/521; B29C 70/545; C08K 7/14; C08K 7/28; B29K 2077/00; B29K 2101/12; B29K 2105/0002; B29K 2105/0014; B29K 2105/12
USPC ........................................................ 524/879
See application file for complete search history.

(56) References Cited

U.S. PATENT DOCUMENTS

| | | | |
|---|---|---|---|
| 2,238,046 A | 4/1941 | Garth | |
| 4,269,712 A | 5/1981 | Hornby et al. | |
| 4,457,970 A | 7/1984 | Das et al. | |
| 4,742,128 A | 5/1988 | Frisch et al. | |
| 5,207,850 A | 5/1993 | Parekh | |
| 5,240,974 A * | 8/1993 | Lechner | C08J 5/08 523/213 |
| 5,294,461 A | 3/1994 | Ishida | |
| 5,374,385 A | 12/1994 | Binse et al. | |
| 5,795,423 A | 8/1998 | Johnson | |
| 2010/0286343 A1* | 11/2010 | Burghardt | B29C 47/0004 525/410 |

FOREIGN PATENT DOCUMENTS

EP          0 320 654 A2    6/1989

* cited by examiner

*Primary Examiner* — Ling Choi
*Assistant Examiner* — Chun-Cheng Wang
(74) *Attorney, Agent, or Firm* — Robert D. Touslee

(57) ABSTRACT

Various methods and systems of making inorganic fiber/flake reinforced composites having a thermoplastic matrix are disclosed. The methods use systems similar to those used to make inorganic fiber/flake reinforced products having a thermoset matrix, but the systems and methods are modified to use thermoplastic precursor monomer(s) followed by in situ polymerization of the monomer(s) during and/or following forming of the desired shape of the products. These methods permit the manufacture of superior inorganic fiber reinforced thermoplastic matrix composites in large and very large shapes heretofore not possible, or practical.

20 Claims, 1 Drawing Sheet

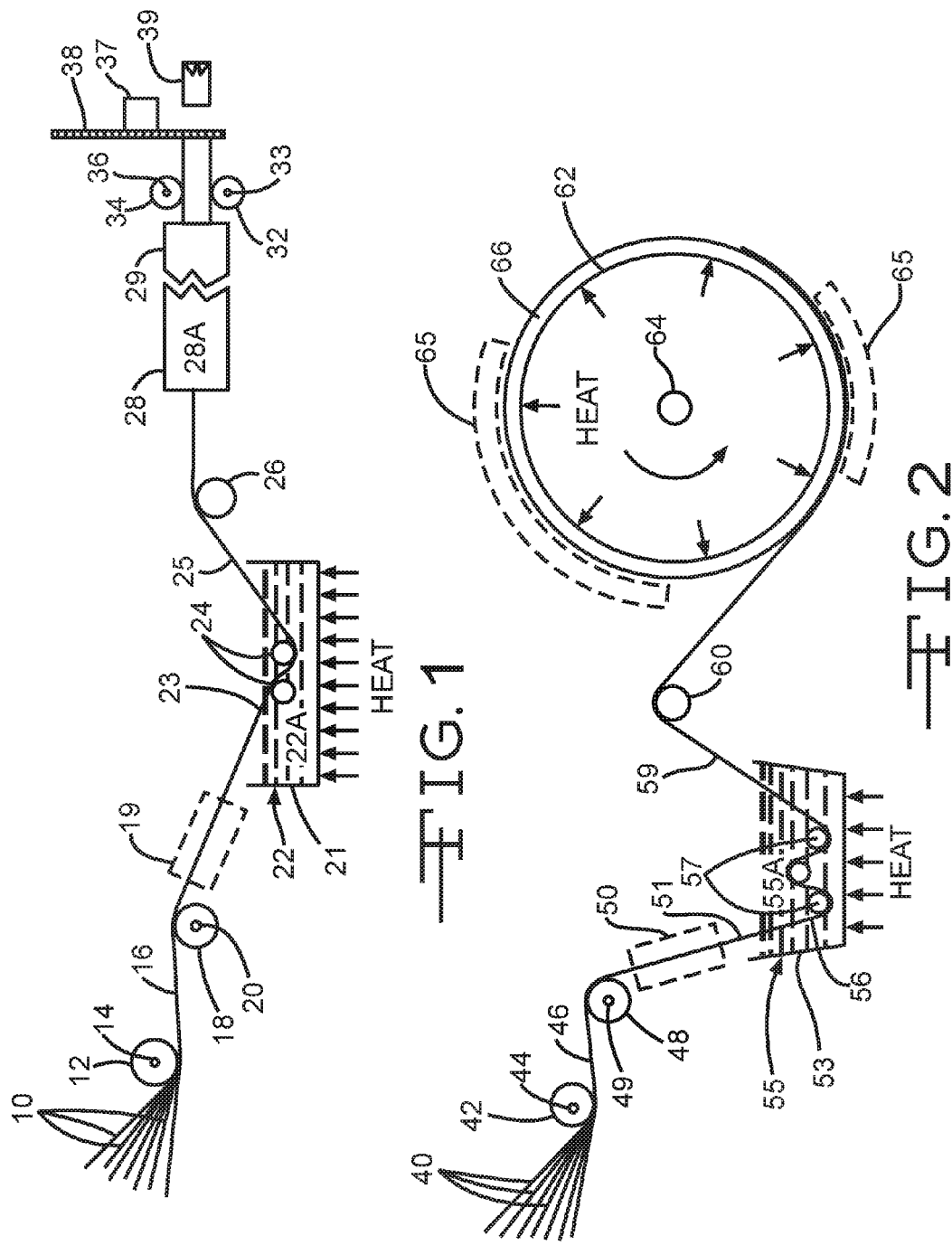

METHODS AND SYSTEMS FOR MAKING REINFORCED THERMOPLASTIC COMPOSITES, AND THE PRODUCTS

CROSS-REFERENCES TO RELATED APPLICATIONS

This application is a continuation of U.S. Nonprovisional patent application Ser. No. 14/496,826, filed Sep. 25, 2014, which is a continuing application of U.S. Nonprovisional patent application Ser. No. 12/476,818, filed Jun. 2, 2009, now U.S. Pat. No. 8,883,908, issued Nov. 11, 2014, the entire contents of which are incorporated by reference herein.

BACKGROUND OF THE INVENTION

In the 1980's there was a mighty development effort by the automotive companies to replace many metal parts of vehicles with glass fiber reinforced composites (GFRC) to reduce weight and increase gas mileage. Some work was done with thermoplastics, but this was limited due to the extremely high tooling costs incurred for injection molding tooling, and because the viscosity of molten thermoplastics is too high for conventional forming processes used to make large and/or structural GFRC parts, such processes as RIM (Reactive Injection Molding), SRIM (Structural Reactive Injection Molding), RTM (Resin Transfer Molding), VARTM (Vacuum Assisted Resin Transfer Molding), SMC (Sheet Molding Compound), BMC (Bulk Molding Compound), spray-up forming, filament winding, LFI (Long Fiber Injection molding) and pultrusion, much work was being done on thermoset GFRC. In the injection molding process chopped glass fibers and pellets of a thermoplastic polymeric resin are fed into an extruder mix the two together at elevated temperature and maceration due to the high viscosity of the molten thermoplastic polymer(s) or copolymer(s). Substantial working and maceration is important and sometimes necessary to wet out the glass fibers at the elevated temperature due to the high viscosity, and as a result the glass fibers are shortened significantly. The resultant mixture is formed into a molding material that is supplied to a press or injection molding system to be formed with very expensive tooling into GFRC parts. During the extrusion process using single or twin-screw machines, the resin is melted and the fibres are dispersed throughout the molten resin to form a fibre/resin mixture. Next, the fibre/resin mixture may be degassed, cooled, and formed into pellets. The dry fibre strand/resin dispersion pellets are then fed to a moulding machine and formed into moulded composite articles that have a substantially homogeneous dispersion of glass fibre strands throughout the composite article. Alternatively, in the process using continuous filaments, fibreglass filaments are mixed with the molten resin in an extruder with the screw geometry designed to mix the matrix with fibres without causing significant damage to the fibres. The resultant extruded mixtures are then compression molded to form long-fibre reinforced thermoplastic parts having superior mechanical properties due to the nature of the orientation and the longer length of the fibers. Because of these difficulties, the use of thermoplastics to make vehicle parts was very limited.

Therefore, much development work was being done and products were being commercialized using thermoset polymer chemistry and materials to make GFRC. Much of this work came to naught because of recycling advantages of metal parts versus thermoset GFRC parts. Metal parts can be remelted at a cost advantage versus melt from iron ore, making scrap metal valuable, but thermoset GFRC parts are not recyclable and no valuable use for scrap thermoset GFRC parts could be found. Consequently, if a significant portion of vehicles were to be made of thermoset GFRC, huge piles of worthless and useless scrap would result along with unfavourable economics. Consequently, further GFRC penetration of the automotive market slowed to almost a standstill, and even regressed in some applications.

With the newly proposed challenging CAFE gas mileage standards just introduced, there is a larger than ever need for lighter weight vehicle parts which thermoplastic GFRC could satisfy, because thermoplastic GFRC scrap is recyclable. The thermoplastic polymers or copolymers can be melted and reclaimed and ground thermoplastic GFRC can be used in conventional thermoplastic forming processes including injection molding, extrusion, etc. Thus, there is a larger than ever need to be able to make thermoplastic GFRC parts using thermoset processes including RIM, SRIM, RTM, VARTM, LFI, SMC, BMC, etc.

It is known to cast low viscosity caprolactam monomers, one containing an activator and another mixture containing a caprolactam monomer and a catalyst by mixing the two very low viscosity mixtures together prior to casting. This mixture must be kept to less than about 100 degrees C. to prevent rapid polymerization, then, following casting, the cast mixture is heated in the mold to cause anionic poylmerization of the monomer to produce a polyamide, but this method is not practical for most vehicle parts and many other current thermoset parts. If thermoplastic GFRC is to replace metals substantially in the automotive industry and elsewhere, economical method(s) must be found that will produce such automotive parts of equal or superior performance at competitive costs with metals. This is achieved with the methods of the invention.

SUMMARY OF THE INVENTION

The invention allows the processes used for making fiber and/or flake reinforced thermoset composites to be used to make fiber and/or flake reinforced thermoplastic composites. This is accomplished by combining low viscosity mixtures of monomer(s) containing one or more catalysts with fibers and/or flakes having on their surfaces a chemical sizing containing one or more activators that upon contact with the catalyst(s) and mixture of one or more monomers and one or more activators and an elevated temperature, such as about 140 to about 200 degrees C., more typically about 150 to about 180 degrees C. and most typically about 150 to about 170 degrees C., causes anionic polymerization of at least about 90 percent, typically more than 97 percent of the monomer(s) resulting in a similar percentage of polycrystalline polyamide or other polymer. Optionally, but typically, all of the fiber, and/or flake, and the monomer-activator mixture are preheated to or near the desired polymerization temperature. When molds are involved, it is typical, but not necessary, that the molds also be preheated at least above the melting point of the monomer when the monomer is solid at room temperature. After forming, the composite, in or out of the mold, can be placed in a hot environment to complete the polymerization to the desired degree. The total polymerization time will depend upon the temperature and degree of polymerization, but generally will require from about 5 to about 15 minutes.

Methods of the invention include methods somewhat like, filament winding, pultrusion, spray-up, hand lay-up, RRIM, SRIM, RTM, VARTM, LFI, SMC, BMC and others, but modified according to the invention in ways described in detail later, but in one or more ways that include preheating the fibers and/or flakes, heating the monomer mixture in an impregnating container, preheating the monomer mixture, heating a mold, mandrel or form, and other equipment. The methods of the invention permit fiber loadings of up to 60 wt. percent or more, preferably up to 50 wt. percent or more, much higher fiber loadings than existing thermoplastic composites. Because of the low viscosity of the monomer/catalyst mixture itself, compared to the typical viscosity ranges of molten polymers in the typical thermoplastic composite manufacturing processes, additional pigments, fillers, including nano-size fillers, can be incorporated in the monomer mixture to achieve desired properties in the reinforced thermoplastic products of the invention. Systems of the invention include systems somewhat like, filament winding, pultrusion, spray-up, hand lay-up, RRIM, SRIM, RTM, VARTM, LFI, SMC, BMC and others, but modified according to the invention in ways described in detail later, but in ways that include one or more pieces of equipment to preheat the fibers and/or flakes, to heat the monomer mixture in an impregnating container, to preheat the monomer mixture, to heat a mold, mandrel or form, and other equipment.

Mineral or other inorganic fibers and/or flakes, including glass fibres and/or flakes, are made by forming and attenuating inorganic molten material into fibers and/or flakes from a fiberizing bushing or orifice, with or without gaseous blasts to further attenuate the fibers and flakes to smaller diameters or thicknesses. Soft, plastic inorganic fibres, usually exiting tips or orifices in refractory metal containers for the molten material, such as glass, are attenuated to the desired diameter by jet blast of combustion gases or steam, by mechanical forces exerted by melt spinning and/or by pulling cooled, solidified portions of the fibers at speeds exceeding at least 1000 ft./min. using a winder or a chopper. Winders wrap the inorganic fibers into packages of direct wound rovings, or provide strands of fibers that, after drying and curing, are used to make up combined rovings or yarn containing a few or many such strands.

Following attenuation of the plastic, inorganic fibers or flakes, water is applied to the hot attenuated fibers and/or flakes to solidify and cool the fibers or flakes and then, conventionally, a chemical sizing composition, or chemical treatment, is applied to the surfaces of the fibres to protect the surfaces, to make the fibers easier to process into packages or to chop, to bind the fibers together when dried to a desired degree, to cause a later applied polymer or copolymer matrix better coat the fibers and to provide a chemical linkage, bond, between the surface of the fibers and the matrix polymer. After the fibres are coated with the sizing, which is typically in aqueous form, they are finished into reinforcing fiber products by either packaging wet or partially drying and packaging in a still wet single end roving package, or fully drying and packaging as a single end roving, drying and combining into a multi-end roving package, or chopping, and packaging in a wet state, or drying after chopping to form chopped fiber strands. Glass fibers are also conventionally made into mats including veil mats, chopped strand mats, nonwoven mats, yarn or roving reinforced nonwoven mats, and scrims, all made by well-known dry and wet processes. Glass fiber products made by one or more of these methods are used in the methods of the invention. Other fibers are usable in the present invention including wollastonite fibers, ceramic fibers, fibers made from rocks such as basalt, fibers made from various slags, carbon fibers, carbon nanotubes, other inorganic nanotubes, and metal fibres. The reinforcement products and materials used in the invention will have a moisture content of no more than about 0.5 wt. percent, typically less than about 0.3 wt. percent and most typically less than about 0.2 wt. percent, often less than about 0.1 wt. percent.

Chemical sizings applied to the surfaces of the glass fibers typically contain a lubricant, a film former and a silane, but the film former is optional for some products. The lubricant protects the surface of the fibers, essential to maximize the strength of the fibers, from scratches, etc. caused by fiber-to-fiber rubbing abrasion and from processing equipment. The silane acts as the chemical linking agent by bonding to the glass fiber and also to the polymer/copolymer matrix. Silanes containing organosilane groups are well known coupling agents for glass fibers and organic (e.g. polymer) phase, and serve to covalently bond the organic groups in the compound to groups on the inorganic surfaces. The optional film former provides the desired degree of bond between the fibers in the fiber strands to avoid fuzzing and excess filamentation during processing in the fiber manufacturers operations and/or in the composite manufacturers' operations. In the invention the sizing also contains one or more ring-opening polymerization activator substance, or a blocked precursor thereof, and a linking compound capable of linking the silane compound and the activator substance. Examples of linking compounds are compounds containing alkyl, aryl, and alkyl-aryl groups that will cause polymerization of the hot catalyst-monomer mixture to form a polymer matrix around and bonded to the reinforcing glass fibers. Sizings can be applied to flakes by spraying onto the flakes in a fluid bed or mixer and followed by drying.

The ring-opening polymerization activator may be any known organic reactive group that participates in a ring-opening polymerization reaction, including anionic ring-opening polymerization, cationic ring-opening polymerization and ring-opening metathesis polymerization (ROMP). The reactive groups may participate in the polymerization by forming a reactive center where further cyclic monomers can join after opening to provide a larger polymer chain through ionic propagation. In a preferred embodiment the activator is a group that serves the function of an activator in the anionic ring-opening polymerization of a lactam or a lactone, e.g. the actiator can be an N-substituted imide group. Some examples of coupling activator compounds useful in the anionic ring-opening polymerization of lactams include certain N-propylsilyl-N'-acyl-ureas described in U.S. Pat. No. 4,697,009, incorporated by reference herein. In another embodiment, the coupling activator compound is 2-oxo-N-(3-(triethoxysilyl)propyl)azepane-1-carboxamide, or similar compounds, present in a range of about 1 to about 2.5 wt. percent of the monomer.

Such polymerizations are well-known in the art and are discussed more completely in U.S. Pat. Nos. 3,621,001; 4,188,478; 5,864,007; 6,579,965; and the patents cited therein, all of which are incorporated by reference herein. Generally, these polymerizations are conducted at low temperatures, 80-160° C. below the melting point of the resulting polyamides (typically above 200° C.), and typically use, in addition to the activator compound, two other ingredients; a lactam monomer and a polymerization catalyst. The monomer component may be a lactam or lactone having from 3 to 12 carbon atoms in the main ring, such as caprolactam and caprolactone. The polymerization catalyst can be an alkali metal salt of the lactam or lactone monomer, such as sodium caprolactam and sodium caprolactone. A catalyst like sodium caprolactam present in the range of about 1.2 to about 3 wt. percent of the monomer is very suitable. There may also be other known auxiliary components in the polymerization mixture such as co-initiators, catalysts, co-catalysts, electron donors, accelerators, sensitizers, processing aids, release agents, etc. Of course, the monomer(s) mixtures can contain any of the known functional ingredients used in thermoplastic polymers, including, but not limited to pigments, fillers, colorants, etc.

In the methods of the invention the resultant products can contain one or more of wollastonite fibers, conventional pigments, fillers, and other additives by including such in the monomer mixtures. In addition to normal size parts made by existing methods for making reinforced thermoplastic composites, very large products can be made using the methods of the invention, such as large body parts, floor pans and high-end thermoplastic composites for applications including wind turbine blades, aircraft parts, automotive parts, pipe and reinforced pressure vessels, tanks, etc.

Many types of polymers are formed in the present invention, most typically polymers formed by ring-opening polymerization reactions including polyamides, including poly(caprolactam), commonly known as "Nylon-6" or "polyamide-6". In the past the high viscosity of the polyamides in the molten state prevented high glass fiber loadings in the finished composites. The high viscosity of the molten polymers at previous molding temperatures of 250-300 degrees C. prevented dispersion of the greater desired amount of glass fibers throughout the molten resin without reducing the length of the fibers to a point where the reinforcement reaches diminishing returns in the processes of producing forming compounds for producing fiber reinforced composites. This problem or barrier is overcome by the invention now that these polymer precursors having low viscosities can be used in modified thermoset resin processes.

Anionic-catalysed ring-opening polymerization of lactams is a commercial method of preparing polyamide resins and such polymerization can be achieved at relatively low temperatures while under atmospheric pressures. Caprolactam is the most used lactam for these reactions and Nylon-6 prepared by this method compares favourably in properties with those prepared by conventional hydrolytic polymerization. The reaction kinetics, absence of by-products, and the crystalline nature of the Nylon produced makes anionic polymerization of lactams a favourable method for several industrial applications, including the processes used in the present invention. In one example, a silane-functionalized isocyanate may be blocked with caprolactam to produce 2-oxo-N-(3 (triethoxysilyl)propyl)azepane-1-carboxamide, which can participate in the anionic ring-opening polymerization of caprolactam monomer. Suitable blocked precursors of suitable coupling activator compounds include isocyanates blocked with compounds other than the activator compound. Under the processing conditions, such blocked isocyanate would become unblocked to furnish free isocyanate. The isocyanate, under the reaction conditions, becomes blocked with the monomer thus forming the polymerisation activator. The silane functionality of the isocyanate compound reacts with the fiber surfaces, such as glass fiber surfaces, producing interfacial adhesion.

According to the invention the activator can be in the chemical sizing on the reinforcing fibers and flakes and the catalyst can be mixed with the monomer. For example, sized glass fibers can be mixed with a cyclic olefin monomer such as norbornene, and a polymerization catalyst to form a polymerization mixture that may then be exposed to conditions sufficient to cause an in situ ring-opening metathesis polymerization of the cyclic olefin monomer, i.e. in situ polymerization. The resulting composite product comprises a polymer matrix in which the glass fibers are grafted onto the polymer matrix with substantially improved coupling between the glass fibers and the polymer. This improved coupling should provide tougher composite materials. Also, in one embodiment, the sized glass substrate may be mixed with a lactam monomer, a caprolactam, and a polymerization catalyst to form a mixture that when exposed to temperatures in the ranges described above, cause in situ anionic ring-opening polymerization of the lactam monomer. While not the most typical, the polymerization catalyst can be placed in the sizing composition and the activator for the monomer can be included in the monomer mixture to achieve polymerization when the sized fibers and/or flakes are combined with the monomer/activator mixture and subjected to the polymerization temperature.

The methods of the invention produce reinforced thermoplastic composite products having a far greater stiffness than existing reinforced thermoplastic composite products and improved elevated temperature performance, such as in a temperature range of about 50 to about 80 degrees C. Another advantage of the methods of the invention is that the molded products can be de-molded while still very hot, and also before polymerization is complete, and either cooled, or put into an environment at the polymerization temperature range until polymerization is complete, followed by cooling. The maximum temperature, and time at polymerization temperature, can be manipulated to control or tailor the properties of the resulting products. Another advantage is that the products during molding and polymerization absorb less moisture due to the high temperatures.

Products of the invention produced by the methods of the invention have polymerization levels of greater than about 90 wt. percent, typically greater than about 93 wt. percent or 95 wt. percent, more typically greater than about 97 wt. percent and sometimes greater than about 98 wt. percent. The degree of crystallinity is at least about 30 wt. percent, typically greater than about 35 wt. percent, often greater than about 40 or 43 wt. percent and sometimes greater than about 45 wt. percent. The melting point of the polyamide 6 polymer in the products of the invention is at least about 210 degrees C., typically above about 212, more typically above about 215, often above about 217 and sometimes above about 218 degrees C. The reinforced thermoplastic products of the invention can also contain pigments, fillers, and other conventional additives by placing these ingredients in the monomer-catalyst mixtures, and/or the monomer-activator mixtures, used in the methods of the invention.

When the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

BRIEF DESCRIPTION OF THE DRAWINGS

FIG. 1 is a front schematic of a modified pultrusion system according to the invention.

FIG. 2 is a side schematic view of a modified filament winding system according to the invention.

DETAILED DESCRIPTION

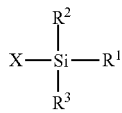

In the anionic ring-opening polymerization of the lactam or lactone monomer, the combination of monomer and the catalyst produces a catalyzed monomer species containing an atom with a reactive free anion. Used herein, the term "ring-opening polymerization activator" is used to denote this catalyzed monomer species, and the term "ring-opening polymerization activator compounds" may be defined as a group that reacts with the catalyzed monomer molecule to cleave the lactam ring and start the initial growth of the polymeric chain. In one embodiment the polymerization catalyst may comprise an alkali metal salt of the lactam or lactone and the activator moiety may comprise an N-substituted imide group, e.g. an N-acyl lactam group. In another example, in the ring-opening metathesis polymerization (ROMP) of a cyclic olefin monomer such a norbornene, cyclopentadiene, cyclooctadiene, decyclopentadiene, etc., the acivator compound can be a cyclic olefin-substituted imide group that undergoes ROMP under catalytic conditions using a heavy metal alkylidene catalyst. In this example the activator becomes part of the polymer chain.

The coupling activator compounds of the invention may be prepared in accordance with the process set forth in the above mentioned incorporated U.S. Pat. No. 4,697,009, e.g. the coupling activator compounds may be prepared by mixing in an aprotic, polar organic solvent such as N,N-dimethylformamide equimolar amounts of an alkali isocyanate (e.g. sodium isocyanate or potassium isocyanate), a 3-halopropyl silane (e.g. 3-chloropropyltriethoxysilane) and caprolactam, and reacting the ingredients with each other at elevated temperature. At the end of the reaction and cooling the mixture to room temperature, the precipitated alkali halide may be filtered off and the solvent may be removed from the filtrate to obtain the desired blocked isocyanate compound. Alternatively, coupling activator compounds may be prepared according to the procedure describe in International Patent No. WO 2006/012957, incorporated herein by reference.

In another embodiment, the coupling activator, 2-oxo-N-(3-(triethoxysilyl)propyl)azepane-1-carboxamide may be prepared in accordance with the following reaction scheme A:

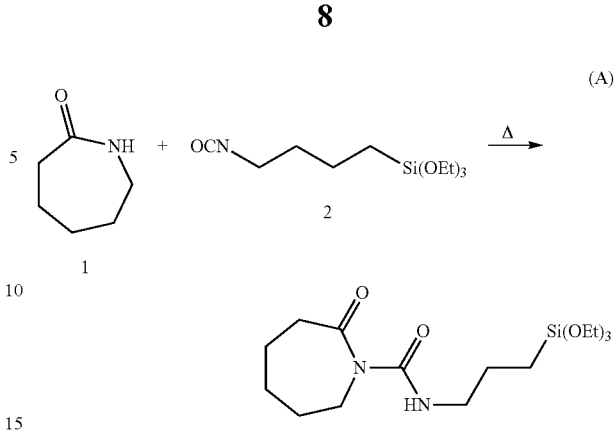

1.1 eq. of caprolactam (1) may be mixed with 1.0 eq. of 3-isocyanatopropyltriethoxysilane (2) and the mixture heated at 80-100° C. until the completion of the reaction and formation of 2-oxo-N-(3-(triethoxysilyl)propyl)azepane-1-carboxamide (3). The reaction progress can be measured by FT-IR, where disappearance of the isocyanate peak at 2300 $cm^{-1}$ should be observed. The reaction may be run neat or in solution, with 1,4-dioxane as the solvent. Organotin catalyst (e.g. dibutyltin dilaurate) may be used to significantly improve the reaction rate.

In one embodiment, a coupling activator compound of the invention may be used as the sole initiator in an anionic ring-opening polymerization reaction, or may be used in combination with other known initiator compounds. For example, the carboxamide (3) activator compound above may be used as the initiator in the reactive extrusion of Nylon-6 in accordance with the following reaction scheme B:

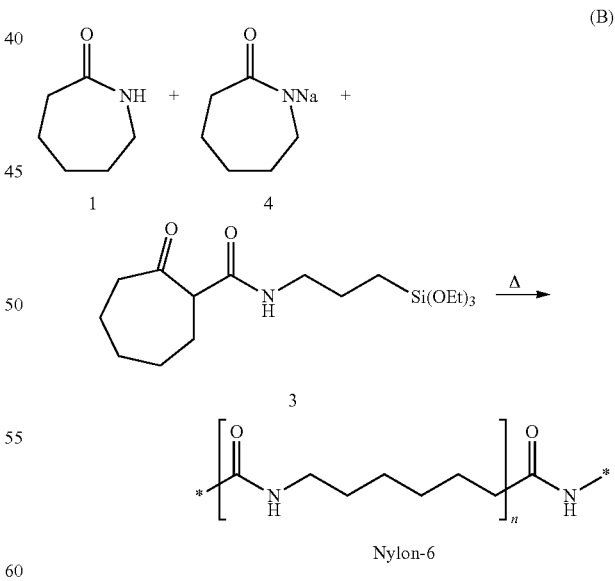

In the above reaction, 97.5 wt % of caprolactam (1) may be mixed with 1.0 wt of 2-oxo-N-(3-(triethoxysilyl)propyl) azepane-1-carboxamide (3). This mixture may be impregnated, coated, or otherwise brought into contact with an array of fibers, such as glass fibers, sized with a composition containing 1.5 wt % of a polymerization catalyst, sodium caprolactam (4), and then this impregnated fiber glass shape brought to, or maintained at, a temperature in the range of 80-205° C., more typically within a range of about 140 to about 190 degrees C. for about 4 to about 15 minutes to accomplish ring-opening polymerization and obtain a glass fiber reinforced thermoplastic product in which the matrix is Nylon-6.

In another embodiment, a coupling activator compound of the invention may participate in a ROMP reaction such as shown in the following reaction scheme C:

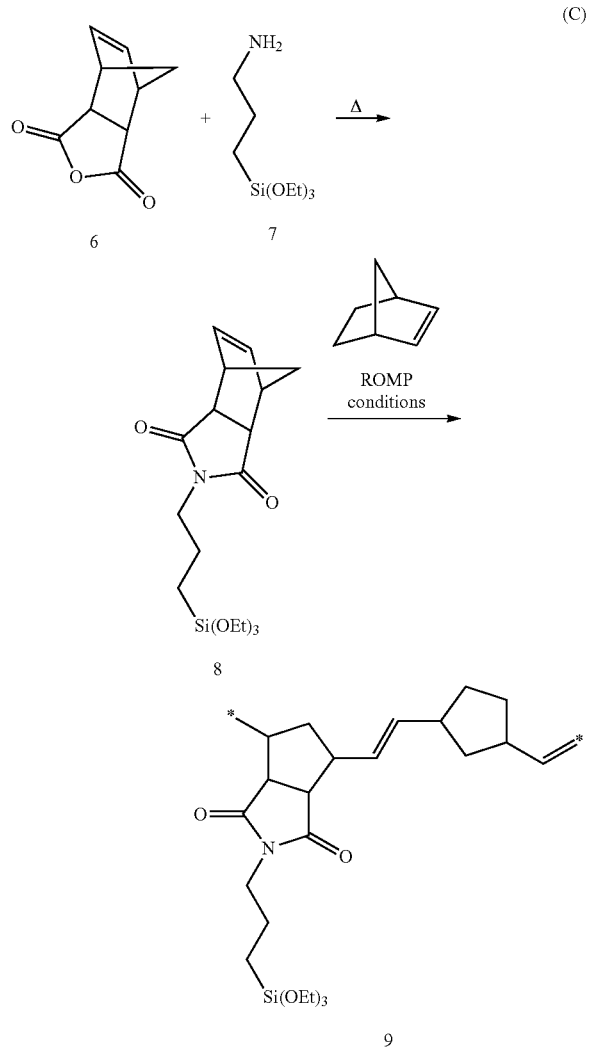

In this case, norbornene-substituted maleic anhydride (6) may be reacted with γ-aminopropyltriethoxysilane (7) to provide a substituted imide coupling activator compound (8). This coupling activator compound (8) can then undergo ring-opening metathesis polymerization (typically under catalytic conditions using rhodium, rhenium, or molybdenum alkylidene catalysts such as were developed by Grubbs or Schrock). Monomers such as cyclopentadiene, cyclooctadiene, dicyclopentadiene, norbornene or other monomers suitable for ROMP may be used to yield polymers such as compound (9).

In another embodiment, the invention uses a mineral or other inorganic fiber having bonded thereto a coupling activator compound of Formula I above. The inorganic substrate can be a plurality of glass fibers wherein at least most of the glass fibers are at least partially coated with the residue of a sizing composition comprising the coupling activator compound. As previously described, the silane ingredient of the sizing covalently bonds to the glass fibers when the composition is coated and dried on the glass fibers, attaching the coupling activator compound to the glass substrate. Glass fibers are particularly suited for reinforcing polyamide resins in the invention. Polyamide resins reinforced with glass fibers include Nylon 6, Nylon 6:6, Nylon 6:12, Nylon 4:6, Nylon 6:10, Nylon 12, polyamide 6T (polyhexamethylene terephthalamide), polyamide 6I (polyhexamethylene isophthalamide) or mixtures thereof. In one embodiment, the coupling activator compound may comprise a blocked precursor of the active activator, e.g. a blocked isocyanate. In this embodiment, the precursor compound may be coated on the glass substrate and the active form of the activator may be generated in situ on the surface of a glass substrate when exposed to unblocking conditions. This process is illustrated by the reaction scheme D below:

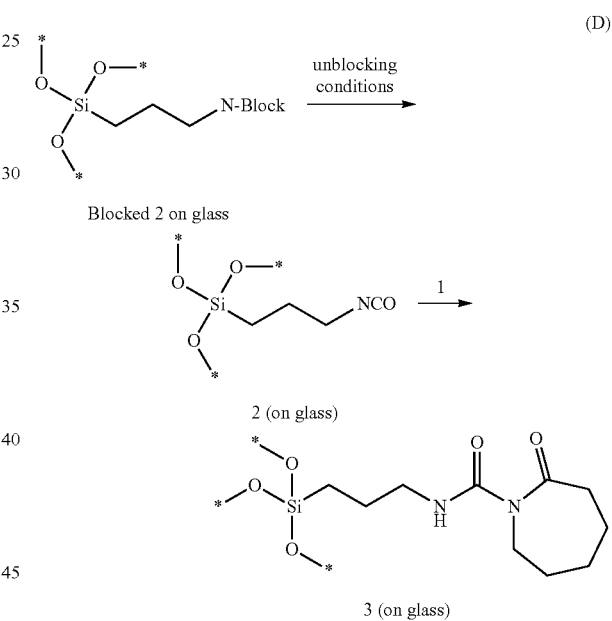

The blocked isocyanate group can be obtained by reacting the isocyanate group of the compound in reaction scheme A above with a compound that renders the isocyanate group unreactive. A suitable blocking agent for the isocyanate group is determined by its ability to prevent the blocked isocyanate from reacting until a desired elevated temperature is achieved. Compounds that may be suitable blocking agents include, but are not limited to this list, oximes such as methyl ethyl ketoxime, acetone oxime, and cyclohexanone oxime, lactams such as ε-caprolactam, and pyrazoles. Organosilicon compounds with a blocked isocyanate group are known in the art, e.g. see U.S. Patent Publication 2007/0123644, incorporated herein by reference. Upon heating or other deblocking conditions, these blocked isocyanates decompose to free isocyanate and the blocking species. Deblocking temperatures depend on the blocking groups and typically are in the range 70-200° C. The blocked isocyanate may be included as a component of the sizing composition used to size glass fibres, and may be applied to glass fibres in the manner previously described to form the entity identified as "blocked 2 on glass" in reaction scheme D above. When the glass fibres with blocked isocyanate compound are exposed to unblocking conditions, e.g. elevated temperatures during reactive extrusion of a glass-reinforced resin, the isocyanate group may become unblocked to form the active isocyanate compound 2 chemically bonded to the glass surface. Once unblocked, the isocyanate group is available to react with the caprolactam monomer 1 in reaction scheme A above, thereby forming coupling activator compound 3 bonded to the glass surface. The coupling activator compound may then enter into the in situ polymerization reaction on the surface of the glass fibres in accordance with the invention. If the isocyanate is blocked with a monomer in the polymerization reaction; e.g. when the isocyanate is blocked by capolactam in the anionic ring-opening polymerization of caprolactam, the blocked isocyanate may not need to dissociate into the free isocyanate in order to facilitate the ring-opening polymerization reaction.

Sizing compositions suitable for use on the fibers used in the present invention may be prepared by adding a coupling activator compound to water or other suitable solvent to form a solution. The sizing composition may also include other sizing composition components known in the art, e.g. film-forming polymers, lubricants, defoamers, biocides, and silanes, etc. The sizing composition should contain an amount of coupling activator compound sufficient to accomplish the desired participation in the ring-opening polymerization reaction with the monomer-catalyst mixture later. The overall concentration of the coupling activator compound and other components in the sizing composition can be adjusted over a wide range according to the means of application to be used, the character of the inorganic reinforcing fibers to be sized, and the intended use of the sized inorganic reinforcing material. In one embodiment, the sizing composition may contain up to about 5 wt % of the coupling activator compound, based on the solids content of the sizing. The components may be added sequentially, or they may be pre-diluted before they are combined to form the sizing composition.

The sizing composition may be applied to the inorganic substrate by suitable conventional methods in the art of making sized reinforcing fiber products. For example, the sizing composition may be applied to glass fibers pulled from a bushing using a standard kiss-roll applicator. Other ways include contacting the glass fibers with different static or dynamic applicators including a belt applicator, spraying, dipping, or any other known suitable means. Alternatively, the coupling activator compound may be added to the binder used in conventional processes of forming woven or nonwoven fibrous mats. After the sizing has been applied, the fibers can be wound into roving packages, optionally dried, or can be chopped to form chopped fiber strands. Rovings of sized continuous fiber strands may be used as is in some methods of the invention, or the rovings can be commingled and/or later chopped to a desired length.

The length and diameter of the chopped glass fiber strands used in the invention for reinforcing polyamide resins is determined by various factors such as, but not limited to, the ease of handling, and processing when the glass fibers impregnated with the polyamide resin precursor mixture, the reinforcing effect of the glass fibres, the ability to disperse the glass fibers, the type of polyamide resin in which the chopped glass fibre will be used to reinforce and the intended use of the molded glass-reinforced polyamide resin product. In some embodiments, the length of the chopped glass fibre strands is about 1.5 mm and an upper limit of length of 75 mm or longer. In some embodiments, suitable for reinforcement of Nylon-6, the length of the chopped strands is about 6 mm to about 25 mm. After the fiber strands have been chopped, they usually are dried to reduce the moisture level of the fibers to a low level, e.g. below 0.1-0.5%. The average diameter of the fibers used in the invention will vary based on the particular forming method being used, but can range from sub-micron to about 30 microns, but typically will range from about 8 to about 23 microns and more typically from about 9 to about 20 microns. For chopped fiber strands the average diameter for many products will range from about 10 to about 17 microns and the rovings will normally contain fibers having average diameters in this range and up to the 23-30 micron size.

Non-limiting examples of glass fibres suitable for use in the invention include, but are not limited to, fibreizable glass compositions including "E-glass", "A-glass", "C-glass", "S-glass", "ECR-glass" (corrosion resistant glass), "R glass", "T-glass", and fluorine and/or boron-free derivatives thereof. Typical formulations of glass fibres are disclosed in K. Lowenstein, The Manufacturing Technology of Continuous Glass Fibres (Third Ed. 1993), incorporated herein by reference.

The invention provides systems and processes for making reinforced thermoplastic resin products, and the products so produced, using mineral and/or inorganic fibers that have bonded thereto one or more coupling activator compounds according to of the present invention. In one embodiment, a sizing composition comprising the coupling activator compound of Formula I above may be applied to glass fibers, the sized glass fibers then are brought into contact with a mixture of lactam monomer and a polymerization catalyst to form a molded product and the molded product is exposed to conditions, such as elevated temperature and time, sufficient to cause an in situ anionic ring-opening polymerization of the lactam monomer, forming a polymer/glass fiber matrix in which the glass fiber is grafted to the polyamide polymer. The polymerization is referred to as "in situ" because the polymer is formed directly on the surface of the glass fibers, versus the prior art methods of first forming the polymer(s) or copolymer(s) and then coating them onto the glass fiber surfaces. As a result, the coupling of the glass fibers and the polymer matrix of the composite material is substantially improved over prior art glass-reinforced polymers/copolymers.

Fiber reinforced thermoplastic polymer products of the invention are produced using unique, novel modifications of well-known forming methods used to make fiber reinforced thermoset matrix composites including pultrusion, filament winding, SRIM, resin transfer molding, and reinforced reaction injection molding (RRIM), vacuum assisted resin transfer molding (VARTM), long fiber injection molding (LFI), sheet molding compounds (SMC), bulk molding compound molding (BMC), spray up, hand lay up, and others. The examples below illustrate the production of glass fiber-reinforced polyamide-6 using such processes of the invention.

EXAMPLE 1

Referring to FIG. 1, continuous, dry glass fiber strands 10, the glass fibers in the strands 10 having been previously sized with a sizing composition comprising an amount of 2-oxo-N-(3-(triethoxysilyl)propyl)azepane-1-carboxamide (compound 3 in reaction scheme A above) within the suitable range disclosed above, a conventional amount of any conventional organosilane normally used in glass fiber sizings, and a conventional amount of one or more conventional glass fiber lubricants conventionally used in glass fiber sizings, are pulled from a plurality of roving packages on racks (not shown) by the puller in the process. The glass fibers in this example are E glass fibers having an average diameter of about 20 micron. The glass fiber strands 10 are pulled over a multi-grooved guide roll 12 supported on a free wheeling mandrel 14 with one or more strands 10 being in each groove to spread out the strands 10 into a horizontal array 16 suitable for impregnation with a monomer-catalyst mixture. The strand array 16 is then passed over the top of a multi-grooved roll 18 similar or like the multi-grooved roll 14, also supported by a free-wheeling mandrel 20 and then the strand array 16 is pulled into a container 21. Optionally the fiber strand array 16 can be preheated by passing through an optional oven 19 to preheat the fibers to at least 100 degrees C. or higher, up to a temperature in the range of about 120 to about 190 degrees C. before entering the container 21. The container 21 is optionally heated and receives a monomer mix 22, preferably preheated, to at least 100 degrees C. or higher, up to a temperature in the range of about 120 to about 140-190 degrees C. before entering the container 21. The monomer mix 22A comprising caprolactam monomer 1 and sodium caprolactam catalyst 4, as shown in reaction scheme B above. The temperature of monomer mix 22A in the container 21 is maintained or further heated in the container 21 with conventional heating means to a temperature of at least about 100 degrees C. and up to about 130 to about 140-190 degrees C. No detrimental amount of polymerization of the monomer will take place or build up in the container 21 because any polymerization of the monomer will be with the activator on the fibers and will be removed from the container 21 with fully coated fiber strands 25. The resultant very low viscosity heated monomer mixture 22 will rapidly impregnate the strands 10 and coat the fibers in the strands 10 with the monomer mixture 22 to form partially coated fiber strands 23 that can be pulled against one or more rods 24 in the container of monomer mixture 22 to spread out the fibers in the partially coated fiber strands 23 and to produce the fully coated fiber strands 25. The fully coated fiber strands 25 are then pulled out of the heated monomer mixture 22 by pulling them over a rod 26 after which they are pulled into and through a mold 28 having a tunnel profile according to the desired cross section profile of the molded product. At least an upstream length section 28A of the mold 28 is maintained at a temperature in the range of about 150 to about 190 degrees C. and is sufficiently long such that the conditions within at least an exterior portion comprising a plurality of the fully coated fiber strands 25 reach a completion of an anionic ring-opening polymerization of the caprolactam 1 in accordance with reaction scheme B, normally requiring about 5-15 minutes.

A resulting glass-reinforced Nylon-6 interim product 30 is then pulled from the mold 28 with opposed driven pulling rollers 32 and 34 mounted on axles 33 and 36 respectively. These driven pulling rollers 32,34 provide the pulling force for the entire process. Optionally, a final length section 29 of the mold 28 can be cooled to a temperature such that an exterior portion of the interim product 30 has stiffer surfaces for the driven puller rolls 32,34 to pull against. The interim product 30 is then cut into desired lengths using a conventional rotating saw blade 38 mounted on a driven axle 37, or with other conventional cutting devices, to form fiber reinforced Nylon-6 products 39. If necessary, or desired, the products 39 can be further processed in a conventional oven (not shown) to complete the polymerization of any monomer mixture in the interior portion of the product 39, and/or in a conventional cooling chamber (not shown) to cool the product 39 to a desired temperature. Alternatively, the cutting of the interim product 30, such as with the cut off rotating saw blade 38, can be conducted following the final heating and/or cooling steps. Thus, any profile shape and length normally made using the pultrusion process conventionally used to make fiber reinforced thermoset polymer/resin products can according to the invention now be used to make fiber reinforced thermoplastic products in which at least about 90 percent of the precursor monomer is polymerized in the pultrusion process.

EXAMPLE 2

This example illustrates the production of a glass fiber-reinforced polyamide-6 using a modified, according to the invention, resin transfer molding (RTM) process or a modified, according to the invention, reinforced reaction injection molding (RRIM) process. A glass fiber preform is made, having or approximating the shape of the desired product, at least in two dimensions, using any conventional manner except that the glass fibers in the glass fiber strands used in the glass fiber products making up the preform, chopped and/or continuous fiber strands, have been sized with a sizing composition comprising a sufficient amount of 2-oxo-N-(3-(triehhoxysilyl)propyl)azepane-1-carboxamide, or other suitable silane coupling agent, 0-70 wt % of a polyurethane emulsion or a suitable mixture of emulsions, 10-50 wt % of a lubricant or mixture of lubricants, and optionally, 0-50 wt % of any other conventional required or desired additives. By sufficient amount is meant an amount that will polymerize at least 90 wt. percent of one or more thermoplastic precursor monomers that will later coat the fibers and become the matrix around the fibers.

The preforms can be made with conventional hand lay up, wet forming, dry forming, and thermoforming process. The preforms can contain one or more layers of chopped fiber strands, woven fiber fabric, chopped strand mat, continuous strand mat, woven or nonwoven scrim, nonwoven fiber mat, and veil mat products, formed or cut to the shape of the cross section of the desired product. As mentioned above, when one or more components of the preform contains a binder bonding the fibers or strands of fibers together, the activator compound can be in the binder instead of in the sizing on the fibers and/or flakes. In an alternative modified process disclosed below, it is not necessary to have an activator compound on the fibers and/or flakes.

In the modified methods used in the invention the preform, preferably heated to at least 100 degrees C. and up to about 200 degrees C., but below the temperature that will cause deterioration of the sizing, is then placed into a mold, normally a metal mold, and preferably a preheated to a similar temperature or a temperature below about 190 degrees C. The mold has removable top and bottom sections. The top section is placed appropriately to form the top of the mold and the top and bottom sections are locked, or otherwise secured tightly, to the mold periphery (sides). The upper part of the mold might be replaced by a vacuum bag where vacuum assisted resin transfer molding (VARTM) is used. The mold will have one or more valved injection ports in desired locations in the periphery, sometimes in the top and/or bottom sections. The mold and the fiber perform are then, if necessary, further heated to a temperature in the range of about 140 to about 200 degrees C., usually by using a cartridge heater or with heated oil in cavities within the mold parts or in an oven, and a monomer-catalyst mixture, like that used in Example 1 above, preferably preheated to at least about 100 degrees C. and up to about 190 degrees C., but below a temperature that would cause deterioration of the mixture, is injected under conventional pressure rapidly into the mold surrounding the perform. Air in the mold and perform is vented out of the mold with conventional vents, or the mold can be evacuated using a partial vacuum if desired, prior to the injection step. As soon as the mold is fully filled as indicated by reaching a desired pressure in the mold, a pressure within the range of about 1 to about 30 bars, more typically within the range of about 3 to about 1-5 bars for low density products and about 5-30 bars for higher density products and/or larger products, the injection ports are shut and the heated filled mold is maintained at a temperature of at least about 150 degrees C. for a time that will produce at least about 90 percent polymerization of the monomer into Nylon-6, usually about 7 to about 12-15 minutes, or alternatively, for a shorter time sufficient to produce sufficient polymerization that the hot product can be removed from the mold without the product deforming during remaining polymerization to at least 90 percent polymerization. De-molding can occur while hot and the molded reinforced thermoplastic Nylon-6 can be removed and either maintained at temperature to complete polymerization and cooled, or if desirably polymerized, cooled to produce the product. No detrimental polymerization takes place in the monomer/catalyst mix prior to injection. A simple one-tank injection system could be used. No additional mixing heat, typically used in thermoset systems, is necessary in the method of the invention, therefore no cleaning of the system parts caused by mixing heat in the prior art processes is required here.

In this method, the products can contain one or more of wollastonite fibers, conventional pigments, fillers, and other additives by including such in the monomer mixtures. Very large products can be made using these methods of the invention, such as large body parts, floor pans and high-end thermoplastic composites for applications such as wind turbine blades, aircraft parts, and reinforced pressure vessels

EXAMPLE 3

Reinforced thermoplastic composite products can also be made using modified BMC processes. In this method, the thermoplastic precursor monomer(s), such as a lactam monomer, and one or more catalyst compounds as disclosed above, is heated to temperature range above the melting point of the monomer(s) and below the reaction temperature of the polymerization and placed into a BMC type or any mechanical mixer that can, optionally, also be heated or cooled. While the mixer is turning, reinforcement in the form of one or more of fibers, flakes and chopped strands of fibers, the fibers or flakes having on their surfaces one or more of the activator compounds, such as that used in Example 1, is slowly added to the monomer mixture while mixing until all reinforcement is added and thoroughly dispersed in the monomer mixture, to form a BMC compound. If desired, the temperature of this mixture can be maintained at the temperature of the monomer/catalyst mixture using either preheated reinforcements or a conventional heating BMC mixer. This BMC compound can then be extruded and cut into slugs, or removed and divided into desired weights for making desired products, all the time maintaining the temperature low enough that significant polymerization does not occur, except that it may be desirable to cause a small amount of polymerization to take place during mixing and/or extrusion to raise the viscosity of the BMC compound to make it easier to divide and handle.

The resultant slugs of cooled BMC are then molded using a conventional press suitable for molding BMC compounds at high pressure while the BMC compound of the invention is in heated matched metal molds and/or dies, the temperature of the mold and/or dies being sufficient to rapidly heat the BMC compound to a temperature in the range of about 140 to about 190 degrees C. The pressure and temperature on the formed BMC compound is maintained for about 5 to about 15 minutes to achieve at least 90 percent polymerization of the monomer(s) after which the formed product can be de-molded hot, or cooled somewhat in the mold before de-molding. Alternatively, the time in the mold can be reduced by polymerizing only the outer portion of the molded shape to at least 90 percent to form an interim product, de-molding and putting the partially polymerized interim product into an oven to complete the polymerization. The resultant reinforced thermoplastic composite products are superior to conventional injection molded reinforced thermoplastic parts because the reinforcement in the parts are larger, i.e. have been reduced in size or length or both by this modified BMC method than by the compounding necessary for making injection molded parts. Also, the cost of the equipment for this method of the invention is substantially less than the cost of equipment needed for conventional injection molding processes.

EXAMPLE 4

Other methods of the invention are modified sheet molding compound (SMC) methods. Two modified methods are suitable. In the first method, one or more layers of fiber reinforcement products including woven roving or yarn fabric and/or scrim, chopped strand mat, continuous strand mat, nonwoven mat, chopped rovings, chopped strands of fiber, chopped filaments, and veil mat in any desired combination are impregnated and coated with the monomer mixture like used in Example 3, or optionally a cool monomer mixture also containing one or more activator compounds, using normal SMC impregnation techniques, except that in this method the viscosity of the monomer mixture often is lower. When the monomer mixture contains only monomer and a catalyst, the sizing on the reinforcement fibers, or the binder bonding the fibers together in the mat(s) will contain the appropriate amount of one or more activator compounds. If it is desired to delay polymerization until the resultant SMC compound is cut and shaped into a desired product in a heated mold and press similar to that disclosed in Example 3, the impregnated SMC is cooled and/or maintained at a temperature below that where significant polymerization of the monomer will take place, at least after a small amount of polymerization has occurred to stiffen up the matrix, until the cut SMC pieces of this method are in the heated mold.

When it is desired to complete the polymerization to at least 90 percent on the modified SMC line, it is desirable that the activator compound(s) be on the surface of the fibers or in the binder bonding the fibers and/or the strands of fiber together. In this option, the monomer mixture is heated to at least 100 degrees C. prior to impregnation, and more typically, to a temperature in the range of 130 to about 150 degrees C. or higher prior to impregnation. Following or even during impregnation, the resulting sheet is carried through an oven to polymerize the monomer(s) in the matrix of the sheet to at least about 90 percent to form a hot, reinforced thermoplastic composite sheet. This hot sheet can either be heated further to a thermoformable temperature, in or prior to molding, and thermoformed into the desired shape and density. Alternatively, the hot reinforced thermoplastic composite sheet can be cooled and used as is for many applications, or can be shipped to a molding customer where it can be reheated to a thermoformable temperature and thermoformed into the desired shapes.

Optionally, any of the above methods can include running the reinforcements through an oven to heat the reinforcements to a temperature of at least 100 and up to about 130 degrees C., and more typically to a temperature in the range of above about 130 and up to about 200 degrees C. prior to the impregnation step. This optional step will speed the polymerization of the monomer matrix and also can shorten the length of the production line because the reinforcement can be heated faster before it is impregnated and coated with the monomer mixture.

EXAMPLE 5

The invention also includes modified filament winding methods for making reinforced thermoplastic composite products. FIG. 2, a front schematic view of a typical filament winding system, will be used to describe the modified methods of the invention. Continuous, dry glass fiber strands and/or strips of woven or nonwoven mat, fabric or scrim 40 are pulled from a plurality of roving packages on racks (not shown) and/or from rolls supported on rotating mandrels (not shown) by the puller in the process, a rotating mandrel 62 and forming product 66 to be described in more detail later. The glass fibers in the strands and/or strips 40 would have usually been previously sized, or bonded together, with a sizing or binder composition comprising an amount of 2-oxo-N-(3-(triethoxysilyl)propyl)azepane-1-carboxamide (compound 3 in reaction scheme A above) within the suitable range disclosed above, and a conventional amount of one or more conventional glass fiber lubricants conventionally used in glass fiber sizings, The glass fibers in this example are E glass fibers having an average diameter in the range of about 8 to about 23 microns. The glass fiber rovings or strands/strip(s) 40 are pulled over a multi-grooved guide roll 42 supported on a free wheeling mandrel 44 with one or more strands/strips 40 being in each groove of the grooved roller 42 to spread out the strands/strips 40 into a horizontal array 46 suitable for impregnation with a monomer-catalyst mixture. The strand array 46 is then passed over the top of another multi-grooved roll 48 similar or like the multi-grooved roll 44, also supported by a free-wheeling mandrel 49 and then the strand array 46 is pulled into a container 53. Optionally the fiber strand array 46 can be preheated by passing through an optional oven 50 to preheat the fibers to at least 100 degrees C. or higher, up to about 170-200 degrees C. to produce heated glass fibers/strip(s) 51, before entering the container 53.

The container 53 is optionally heated and contains a monomer mix comprising caprolactam monomer 1 and sodium caprolactam catalyst 4, as shown in reaction scheme B above. This monomer mix 55 can preferably be preheated prior to entering the container 53, and maintained at the entering temperature or further heated in the container 53 with conventional heating means to a temperature of at least about 100 degrees C. and up to about 130 to about 140 degrees C., No detrimental amount of polymerization buildup will occur in the container 53 and resident monomer mixture 55 of the monomer because any polymerization that does occur in the container 53 will take place on the fibers and will be carried out of the container 53 with fully coated fiber strands 59. This resultant very low viscosity heated monomer mixture 55A will rapidly impregnate the strands/strip(s) 46 or heated strands/strip(s) 51 and coat the fibers in the strands/strip(s) 46 with the monomer mixture 55 to form partially coated fibers 56 that can be pulled against one or more rods 57 in the container of monomer mixture 55 to spread out the partially coated glass fibers 56 in the strands 46 or 51 and to produce fully coated fibers in the fiber strands/strip(s) 59.

The fully coated fiber strands/strip(s) 59 are then pulled out of the heated monomer mixture 55 by pulling them over a rod 60 after which they are pulled onto a rotating mandrel or form 62, preferably heated to a temperature in the range of about 150 to about 190 degrees C. with any suitable heating method. The rotating mandrel or form 62 is supported and driven by driven rotating supports 64, one of such supports 64 connected to each end of the mandrel or form 62 at its horizontal axis. Rapid polymerization can begin as soon as the heated and fully coated fiber strands/strip(s) 59 contact a rotating heated mandrel or form 62, or previously laid down material 66 heated by the heated mandrel or form 62. Alternatively, or in addition, when formation of the desired shape is completed, the entire mandrel or form 62 and/or formed product can be removed from the supports 64, or from the mandrel or form 62 and placed in a hot oven to complete the polymerization to a point where at least 90 percent of the monomer has been polymerized. Completion of the anionic ring-opening polymerization of the caprolactam 1 in accordance with reaction scheme B, normally requires about 5-15 minutes at the above described rapid polymerization temperature range. Instead of, or in addition to, internal heaters for heating the mandrel or form 62, one or more external heaters 65, such as convection heaters, radiation heater(s), IR heaters, can be spaced from portions, or most of, the mandrel or form 62 and the interim product 66. In the above-described system, all of the elements 42 through 60 normally shuttle back and forth along the length of the mandrel or form 62 at a desired speed to produce a desired pattern of fiber strands/strip(s) in the formed glass fiber reinforced Nylon-6 product.

Using this method of the invention, very large, continuous glass fiber reinforced thermoplastic pipes, tanks, or other hollow shapes can, for the first time be rapidly made at a relatively low cost and superior quality compared to previous methods.

EXAMPLE 6

In this method, fiber rovings, more typically glass fiber rovings, are fed to spray up equipment including a roving chopper, the fibers having a sizing on their surfaces containing one or more activator compounds and in amounts, as described above, and a monomer/catalyst(s) mixture as used in one or more of the above Examples is sprayed onto the reinforcing fibers of the chopped rovings from one or a plurality of spray nozzles. The monomer(s) mixture is heated to a temperature of at least about 100 degrees C. and up to a temperature of 200 degrees C., more typically in a range of about 100 to about 190 degrees C. before being sprayed onto the chopped rovings and the so coated chopped rovings are directed onto a mold element or earlier applied coated chopped rovings. After molding is completed or during molding and after molding is completed, the monomer mixture coated chopped rovings are heated to a temperature in the range of about 140 to about 190 degrees C. to polymerize at least about 90 percent of the monomer(s) to produce a fiber reinforced thermoplastic composite. The mold element can optionally be heated to a temperature in the range of about 100 to about 190 degrees C. before the first monomer coated chopped rovings are sprayed onto the mold element.

Instead of heating the reinforcement and/or monomer(s) mixture to a temperature above about 100-130 degrees C. during and/or after the mixture of these materials are building up on the mold element, the resulting built up interim product can be cooled to solidify the monomer(s) mixture to give the interim product rigidity and strength sufficient to remove a perform product from the mold element and to handle it to place it into a matched metal mold preheated to a temperature in the range of about 140 to about 190 degrees C. after which the perform is pressed and heated to the temperature range of the preheated mold while under a high pressure of at least about 5 bars to densify the perform and form the desired shape until at least sufficient monomer(s) in the exterior portion of the shape has polymerized sufficiently to maintain the desired shape after de-molding, or until at least about 90 percent of the monomer(s) have been polymerized. After de-molding, the partially polymerized shape is maintained at a temperature in the range of about 140 to about 190 degrees C. until at least about 90 percent of the monomer(s) has polymerized.

Very large and complex shapes including hot tubs, bath tubs, shower stalls, boat parts, and the like can be made using this method.

EXAMPLE 7

The conventional long fiber injection molding process combines a resin with long fibers in a mixing head and then injects this mixture into a matched metal mold under high pressure. When using thermoplastic resins, the high viscosity of the molten thermoplastic polymer inhibits thorough coating of the long reinforcing fibers and/or slows the mixing and molding cycle substantially. In this method of the invention, a monomer/catalyst mixture of the type disclosed above in Example 2 is heated to a temperature of at least 100 degrees C. and up to about 140-150 degrees C. prior to entering the mixing head, and long inorganic fibers, more typically glass fibers, have on their surfaces a sizing containing an activator of the type used in Example 2. Optionally the inorganic fibers can be preheated to a temperature of at least about 100 degrees C. and up to about 140-150 degrees C. prior to being contacted with the heated monomer mixture. Because of the low viscosity of the monomer mixture, it can also contain one or more pigments, fillers, colorants, or other desired ingredients.

The monomer mixture impregnated long inorganic fibers are then injected under high pressure into a matched metal mold to produce a desired shape. Optionally the mold is heated to a temperature in the range of about 130 to about 190 degrees C. to begin polymerizing the monomer(s) that are against the heated mold surface and in the outer shell of the formed shape. The mold is then shuttled into a press to polymerize under pressure and the desired temperature. The desired shape is de-molded either after sufficient polymerization has taken place that the de-molded shape is stable, or after at least 90 percent of the monomer(s) have been polymerized. In the option of early de-molding, the de-molded shape is maintained in an environment of at least about 130 to about 190 degrees C. until the at least about 90 percent polymerization is complete. Advantages of this method of the invention is that the mixing head does not have to be cleaned very often and that many different kinds of reinforced thermoplastic polymers can be produced, including Nylon-6 and Nylon-66.

The advantages in addition to those mentioned above will be obvious to those of ordinary skill in the art, e.g. the substantially lower molding temperatures compared to the molding of molten thermoplastic polymers/copolymers, and the substantially lower equipment and operating costs resulting. Also, different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

What is claimed is:

1. A method of making a reinforced thermoplastic composite product comprising:
    forming and attenuating molten glass into glass fibers from a fiberizing bushing;
    coating the glass fibers with an aqueous sizing composition to form sized glass fibers;
    drying the sized glass fibers to form dried glass fibers;
    preparing a resin mixture containing one or more thermoplastic precursor monomers and one or more catalyst compounds;
    heating at least one of the dried glass fibers or the resin mixture, wherein:
        heating the dried glass fibers comprises heating the dried glass fibers to a temperature of at least about 100 degrees C., or
        heating the resin mixture comprises heating the mixture to a temperature of at least about 100 degrees C.;
    impregnating the dried glass fibers with the resin mixture to form an amalgam of glass fibers and resin mixture prior to contacting a mold element followed by bringing the impregnated glass fibers into contact with the mold element, or alternatively impregnating the dried glass fibers with the resin mixture while the resin mixture is in the mold element, to form a desired shape of impregnated glass fibers, and
    heating the amalgam to a temperature in a range of about 140 to about 190 degrees C. until at least about 90 percent of the monomer(s) have polymerized to one or more thermoplastic polymers.

2. The method of claim 1, wherein the aqueous sizing composition comprises one or more activator compounds.

3. The method of claim 2, wherein the one or more activator compounds comprise N-propylsilyl-N'-acyl-ureas.

4. The method of claim 2, wherein the one or more activator compounds comprise 2-oxo-N-(3-(triethoxysilyl)propyl)azepane-1-carboxamide.

5. The method of claim 1, wherein the resin mixture further contains one or more activator compounds that will react with the monomer(s)/catalyst(s) to cause polymerization.

6. The method of claim 1, further comprising heating a mold element to a temperature in the range of about 130 to about 200 degrees C. prior to impregnating the dried glass fibers with the resin mixture.

7. The method of claim 1, wherein both the dried glass fibers and the resin mixture are heated to a temperature above about 100 degrees C. prior to impregnating the dried glass fibers with the resin mixture.

8. The method of claim 1, wherein the resin mixture also comprises one or more materials selected from a group consisting of a filler, a pigment, and a colorant.

9. The method of claim 1, wherein the monomers comprise a lactam or lactone having from 3 to 12 carbon atoms in the main ring.

10. The method of claim 1, wherein the monomers comprise caprolactam or caprolactone.

11. The method of claim 1, wherein the one or more catalyst compounds comprise an alkali metal salt of the monomer.

12. The method of claim 1, wherein the one or more catalyst compounds comprise sodium caprolactam.

13. The method of claim 1, wherein the resin mixture comprises no activator compounds.

14. A method of making a reinforced thermoplastic composite product comprising:
  forming and attenuating molten glass into glass fibers from a fiberizing bushing;
  coating the glass fibers with an aqueous sizing composition comprising one or more activator compounds to form sized glass fibers;
  drying the sized glass fibers to form dried glass fibers;
  preparing a resin mixture containing one or more thermoplastic precursor monomers and one or more catalyst compounds, the catalyst compound(s) causing polymerization of the monomer(s) when brought into contact with the dried glass fibers, the one or more activator compounds being materials that will react with the one or more thermoplastic precursor monomers to cause polymerization of the monomers in a temperature range of about 140 to about 200 degrees C. to produce a thermoplastic matrix around glass fibers,
  heating at least one of the dried glass fibers or the resin mixture, wherein:
    heating the dried glass fibers comprises heating the dried glass fibers to a temperature of at least about 100 degrees C., or
    heating the resin mixture comprises heating the resin mixture to a temperature of at least about 100 degrees C.;
  impregnating the dried glass fibers with the resin mixture to form an amalgam of glass fibers and resin mixture prior to contacting a mold element followed by bringing the impregnated glass fibers into contact with the mold element, or alternatively impregnating the dried glass fibers with the resin mixture while the resin mixture is in the mold element, to form a desired shape of impregnated glass fibers, and
  heating the amalgam to a temperature in a range of about 140 to about 190 degrees C. until at least about 90 percent of the monomer(s) have polymerized to one or more thermoplastic polymers.

15. The method of claim 14, further comprising heating a mold element to a temperature in the range of about 130 to about 200 degrees C. prior to impregnating the dried glass fibers with the resin mixture.

16. The method of claim 14, wherein both the dried glass fibers and the resin mixture are heated to a temperature above about 100 degrees C. prior to impregnating the dried glass fibers with the resin mixture.

17. The method of claim 14, wherein the monomers comprise a lactam or lactone having from 3 to 12 carbon atoms in the main ring.

18. The method of claim 14, wherein the monomers comprise caprolactam or caprolactone.

19. The method of claim 14, wherein the one or more catalyst compounds comprise an alkali metal salt of the monomer.

20. The method of claim 14, wherein the resin mixture comprises no activator compounds.

* * * * *